(12) United States Patent
Velasco et al.

(10) Patent No.: US 9,719,694 B1
(45) Date of Patent: Aug. 1, 2017

(54) SOLAR HEAT COLLECTING ELEMENT HAVING AN EDGE WELDED BELLOWS ASSEMBLY

(75) Inventors: David Velasco, Clifton, NJ (US); John Ditri, Huntingdon Valley, PA (US); Nancy E. Wasson, Mount Laurel, NJ (US); Kristopher Thomas Heick, Bel Air, MD (US)

(73) Assignee: Lockheed Martin Corporation, Bethesda, MD (US)

( * ) Notice: Subject to any disclaimer, the term of this patent is extended or adjusted under 35 U.S.C. 154(b) by 848 days.

(21) Appl. No.: 13/272,927

(22) Filed: Oct. 13, 2011

Related U.S. Application Data

(63) Continuation-in-part of application No. 12/701,183, filed on Feb. 5, 2010.

(51) Int. Cl.
*F24J 2/05* (2006.01)
*F24J 2/46* (2006.01)

(52) U.S. Cl.
CPC ............... *F24J 2/05* (2013.01); *F24J 2/4636* (2013.01)

(58) Field of Classification Search
CPC ........................................................ F24J 2/05
USPC ........................................ 126/652, 651, 677
See application file for complete search history.

(56) References Cited

U.S. PATENT DOCUMENTS

| | | | |
|---|---|---|---|
| 1,294,466 A | 2/1919 | Houskeeper | |
| 1,560,690 A | 11/1925 | Houskeeper | |
| 1,786,506 A | 12/1930 | Ray | |
| 2,172,612 A | 9/1939 | Hassenkamm | |
| 2,427,456 A * | 9/1947 | Hoy | 285/267 |
| 2,687,146 A | 8/1954 | Ferguson | |
| 4,133,298 A | 1/1979 | Hayama | |
| 4,186,725 A | 2/1980 | Schwartz | |
| 4,231,353 A | 11/1980 | Kanatani et al. | |
| 4,505,263 A | 3/1985 | Nameda et al. | |
| 4,523,578 A | 6/1985 | Sabet | |
| 4,554,908 A * | 11/1985 | Hanlet et al. | 126/652 |
| 4,565,263 A * | 1/1986 | Southworth | 182/182.5 |
| 4,674,477 A | 6/1987 | Tabor | |
| 4,703,749 A | 11/1987 | Morse | |
| 4,803,972 A | 2/1989 | Janson | |
| 4,924,756 A | 5/1990 | Berube et al. | |
| 5,177,977 A * | 1/1993 | Larsen | 62/235.1 |
| 6,155,250 A | 12/2000 | Mieda et al. | |
| 6,324,870 B1 | 12/2001 | Chabin et al. | |
| 6,631,928 B1 * | 10/2003 | Sakata | 285/226 |
| 6,705,311 B1 * | 3/2004 | Schwartzman | F24J 2/055 126/652 |

(Continued)

OTHER PUBLICATIONS

Burkholder, F. et al., "Heat Loss Testing of Schott's 2008 PTR70 Parabolic Trough Receiver," Technical Report NREL/TP-550-45633, May 2009, National Renewable Energy Laboratory, 58 pages.

(Continued)

*Primary Examiner* — Avinash Savani
*Assistant Examiner* — Aaron Heyamoto
(74) *Attorney, Agent, or Firm* — Withrow & Terranova, PLLC

(57) ABSTRACT

A solar heat collecting element for use in solar troughs and solar power systems. The solar heat collecting element includes a conduit for carrying a heat transfer fluid; a light transparent envelope disposed about the conduit; and an edge welded metal bellows assembly coupling a first end of the conduit with a first end of the envelope.

19 Claims, 8 Drawing Sheets

(56) References Cited

U.S. PATENT DOCUMENTS

| | | | |
|---|---|---|---|
| 7,013,887 B2* | 3/2006 | Kuckelkorn et al. | 126/652 |
| 7,562,655 B2 | 7/2009 | Kuckelkorn et al. | |
| 8,097,318 B2 | 1/2012 | Mientkewitz et al. | |
| 8,881,721 B2 | 11/2014 | Morber et al. | |
| 2008/0216823 A1 | 9/2008 | Kmetovicz et al. | |
| 2009/0090109 A1* | 4/2009 | Mills et al. | 60/659 |
| 2011/0233013 A1* | 9/2011 | Siebke | F16D 65/18 188/264 G |
| 2012/0272950 A1 | 11/2012 | Martinez Sanz et al. | |

OTHER PUBLICATIONS

Forristall, R., "Heat Transfer Analysis and Modeling of a Parabolic Trough Solar Receiver Implemented in Engineering Equation Solver," Technical Report NREL/TP-550-34169, Oct. 2003, National Renewable Energy Laboratory, 164 pages.

Lei, Dongqiang et al., "The study of One-Through Solar Absorber Receiver," International Conference on Sustainable Power Generation and Supply, Apr. 6-7, 2009, IEEE, 4 pages.

Melchior, Tom et al., "A cavity-receiver containing a tubular absorber for high-temperature thermochemical processing using concentrated solar energy," International Journal of Thermal Sciences, vol. 47, Issue 11, Nov. 2008, Elsevier Masson SAS, pp. 1496-1503.

Non-Final Office Action for U.S. Appl. No. 12/701,183, mailed Jun. 7, 2013, 18 pages.

Final Office Action for U.S. Appl. No. 12/701,183, mailed Dec. 6, 2013, 18 pages.

Advisory Action for U.S. Appl. No. 12/701,183, mailed Feb. 19, 2014, 3 pages.

Non-Final Office Action for U.S. Appl. No. 12/701,183, mailed Apr. 24, 2014, 17 pages.

Final Office Action for U.S. Appl. No. 12/701,183, mailed Sep. 25, 2014, 17 pages.

Non-Final Office Action for U.S. Appl. No. 13/173,331, mailed Nov. 7, 2013, 7 pages.

Final Office Action for U.S. Appl. No. 13/173,331, mailed Apr. 8, 2014, 7 pages.

Notice of Allowance for U.S. Appl. No. 13/173,331, mailed Jul. 17, 2014, 7 pages.

Corrected Notice of Allowability for U.S. Appl. No. 13/173,331, mailed Oct. 6, 2014, 4 pages.

Non-Final Office Action and Applicant-Initiated Interview Summary for U.S. Appl. No. 12/701,183, mailed Oct. 22, 2015, 18 pages.

Notice of Allowance and Applicant-Initiated Interview Summary for U.S. Appl. No. 12/701,183, mailed Apr. 8, 2016, 11 pages.

\* cited by examiner

SOLAR HEAT COLLECTING ELEMENT HAVING AN EDGE WELDED BELLOWS ASSEMBLY

FIELD

This present disclosure relates to solar heat collecting devices. More particularly, the present disclosure relates to a solar heat collecting element that uses an edge welded metal bellows assembly.

BACKGROUND

Parabolic solar troughs for generating electricity from sunlight energy, include heat collector elements. Typical heat collector elements include a pipe-like solar absorber disposed within a glass envelope, for carrying a heat transfer fluid. Because the solar absorber and the glass envelope have different coefficients of linear thermal expansion, the solar absorber and the glass envelope expand and contract longitudinally at significantly different rates. To compensate for the different linear thermal expansion and contractions, formed bellows assemblies are used for coupling the glass envelope to the solar absorber. One end of the bellows assembly is usually attached to the solar absorber by a welded joint and the other end of the bellows assembly is usually attached to the glass envelope by a glass-to-metal seal.

The solar heat collector elements heat cycle daily with temperatures approaching 400 degrees centigrade. These daily temperature fluctuations contribute to potential stresses in the glass envelope, particularly at the glass-to-metal seal. Due to the temperature range and the significantly different rates of thermal expansion between the solar absorber and the glass envelope, a significant increase in longitudinal expansion is experienced by the solar absorber with respect to the glass envelope.

The main objective of the solar absorber is to collect as much available solar radiation as possible. The solar absorber in current heat collector elements that employ formed bellows assembly at each end, have approximately 3 percent of their surface area shielded by the bellows assembly. The shielding of the solar absorber reduces the optical efficiency of the solar heat collector element.

Accordingly, a solar heat collector element with greater optical efficiency is desired.

SUMMARY

A solar heat collecting element is disclosed herein. The solar heat collecting element includes a conduit for carrying a heat transfer fluid; a light transparent envelope disposed about the conduit; and an edge welded metal bellows assembly coupling a first end of the conduit with a first end of the envelope.

Also disclosed herein is a solar trough. The solar trough includes a solar heat collecting element and a light concentrator for directing solar radiation onto the solar heat collecting element. The solar heat collecting element includes a conduit for carrying a heat transfer fluid; a light transparent envelope disposed about the conduit; and an edge welded metal bellows assembly coupling a first end of the conduit with a first end of the envelope.

Also disclosed herein is solar power system. The solar power system includes a plurality of solar troughs each having a solar heat collecting element and a light concentrator for directing solar radiation onto the solar collecting element. The solar heat collecting element of at least one of the solar troughs includes a conduit for carrying a heat transfer fluid; a light transparent envelope disposed about the conduit; and an edge welded metal bellows assembly coupling a first end of the conduit with a first end of the envelope.

DETAILED DESCRIPTION

Figure 1:
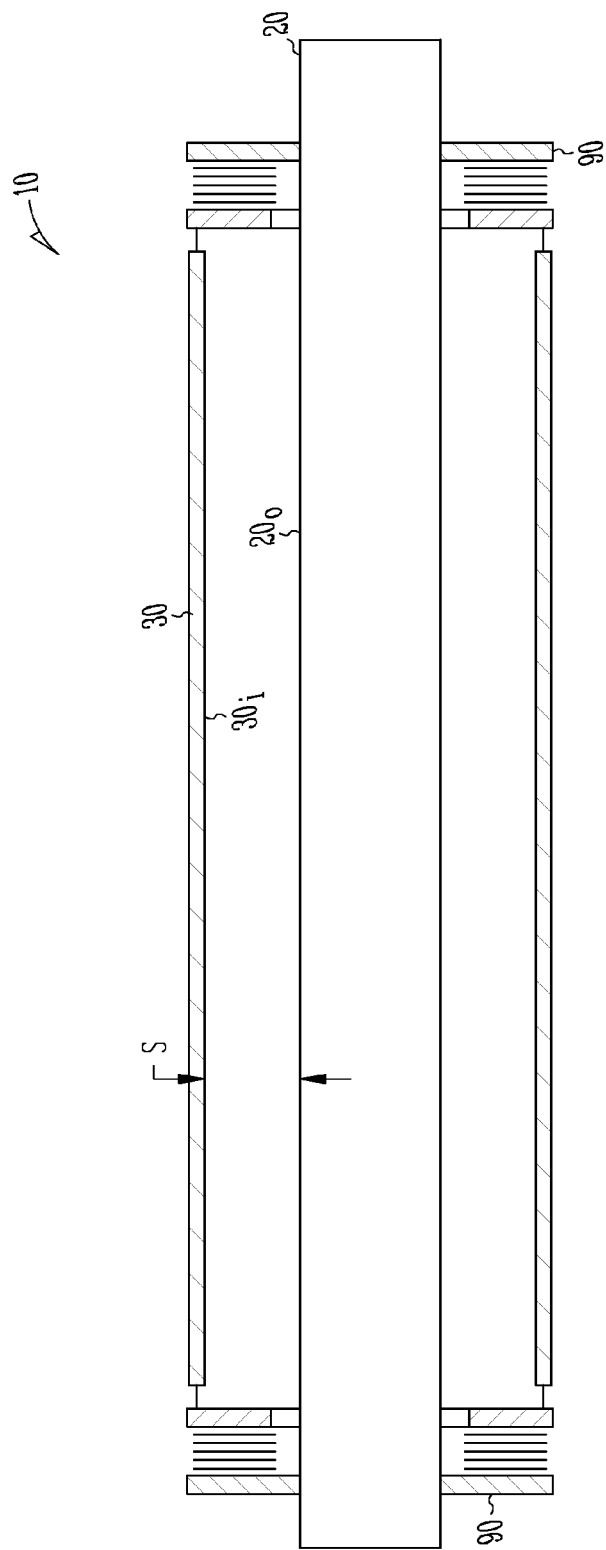
FIG. 1 is an elevational view of an embodiment of a solar heat collecting element with portions thereof shown in cross-section.

FIG. 1 shows an embodiment of a solar heat collecting element (SHCE) 10 according to the present disclosure. The SHCE 10 generally comprises a glass envelope 30 and a solar absorber 20 disposed within the glass envelope 30, for carrying a heat transfer fluid. In one embodiment, the SHCE 10 has a length of about 4 meters, although other embodiments of the SHCE 10 may be less than or greater than 4 meters in length. The solar absorber 20 of the SHCE 10 absorbs the solar radiation and converts it into heat, which is transmitted to the heat transfer fluid flowing therethrough.

Figure 5:
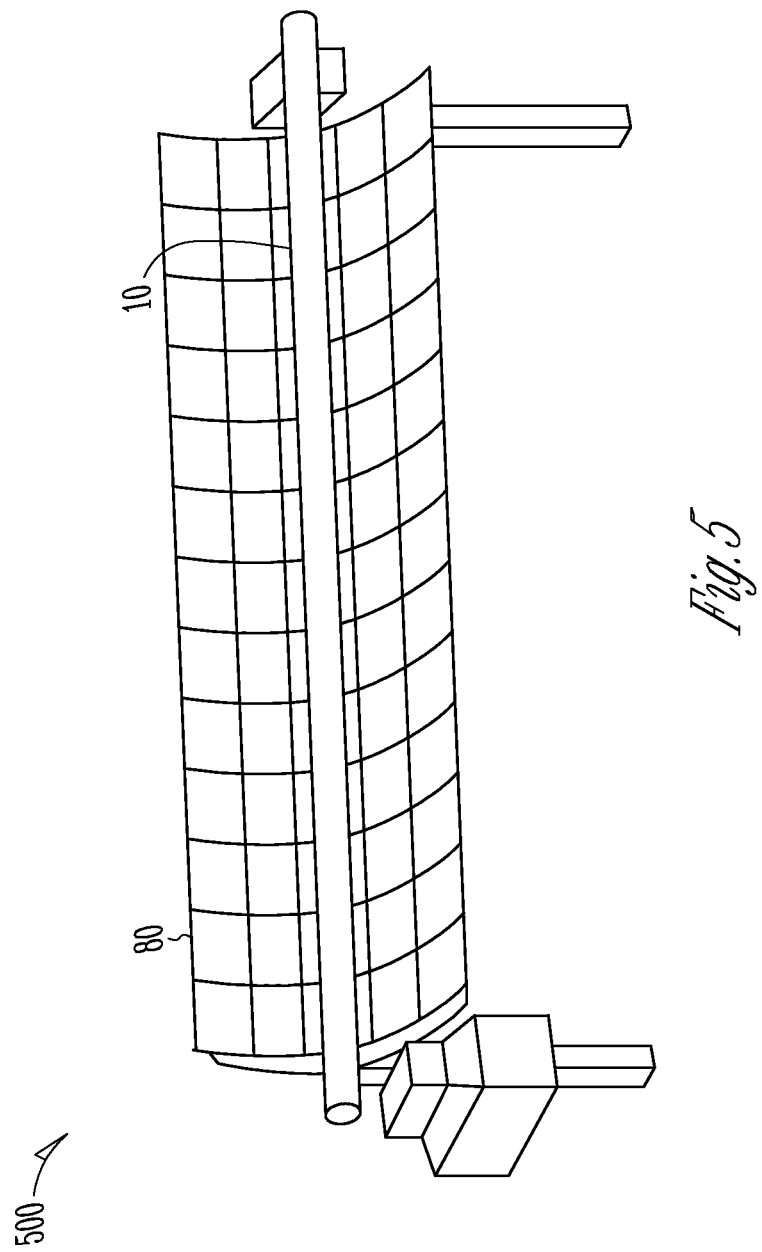
FIG. 5 is a perspective view of an embodiment of a parabolic solar trough according to the present disclosure.
Figure 6:
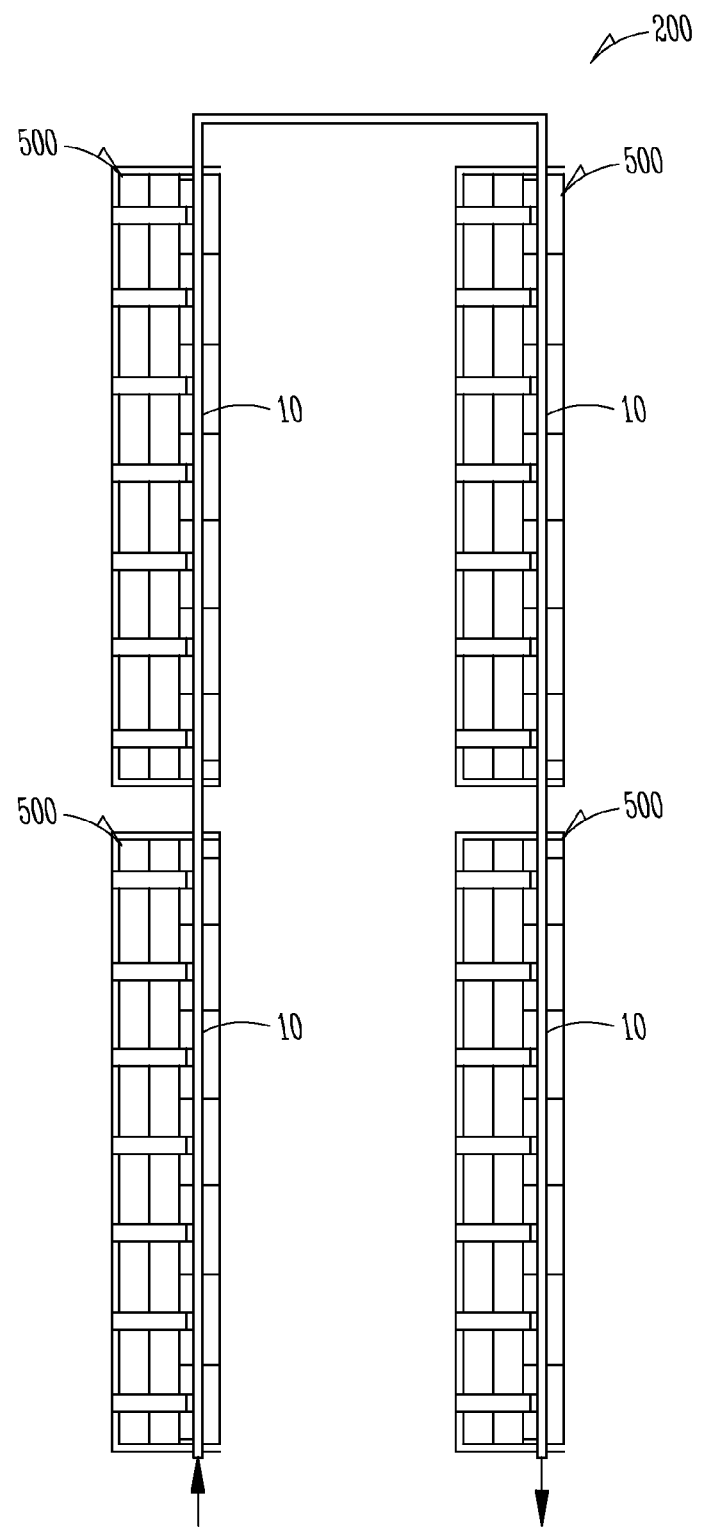
FIG. 6 is a plan view of an embodiment of a solar power system according to the present disclosure.

The SHCE 10 may be used in a parabolic solar trough 500 as shown in FIG. 5. A plurality of serially coupled parabolic solar troughs are commonly used in a solar field or system 200 to convert sunlight to energy (FIG. 6). The parabolic solar trough 500 includes a light concentrator 80, e.g., a parabolic mirror, which focuses or concentrates sunlight on the SHCE 10. The SHCE 10 may also be used in any other solar thermal energy collector to convert focused sunlight to energy.

Referring again to FIG. 1, the solar absorber 20 of the SHCE 10 is formed by an elongated hollow pipe which extends the length of the SHCE 10. The pipe forming the solar absorber 20 may be any suitable shape or combination of shapes and made of a suitable material including but not limited to metals, alloys, polymers, and composites. The solar absorber 20 may have a fixed, stepped or varying diameter and/or width, and have a fixed, stepped or varying wall thickness. In one embodiment, the solar absorber 20 may be made of steel, carbon steel, or stainless steel, and constructed in a cylindrical shape.

The glass envelope 30 may extend continuously about the entire outer surface 20o of the solar absorber 20 so that the solar absorber 20 is coaxially disposed within the glass envelope 30. The glass envelope 30 should be made from a glass that is highly transparent to solar light which has a wavelength of about 390 to 780 nanometers, to allow for maximum sunlight to impinge on the solar absorber 20. As shown in FIG. 1, the glass envelope 30 is constructed so that the inner surface 30*i* of the glass envelope 30 is separated from the outer surface 20*o* of the solar absorber 20 by a space S. In one exemplary embodiment, the space S between the inner surface 30*i* of the glass envelope 30 and outer surface 20*o* of the solar absorber 20 may be evacuated to form a substantial vacuum therein. In other embodiments, the space S between the inner surface 30*i* of the glass envelope 30 and outer surface 20*o* of the solar absorber 20 may be filled with air or some other fluid, i.e., gas or liquid. The vacuum or fluid contained in the space S operates as a heat insulator to prevent heat loss from the solar absorber 20.

In parabolic solar trough applications, the solar absorber 20 of the SHCE 10 typically has an outer diameter of about 70 mm. In such an embodiment, the insulation vacuum contained in the space S may be optimized by using a glass envelope 30 having an outer diameter between about 115 mm and about 120 mm to provide a space S having a width between about 19 mm and 25 mm. The optimization of the insulation space S counters sag of the solar absorber 20 as it heats up. In other embodiments and/or applications, the outer diameter of the glass envelope 30 and the width of the space S may be other dimensions. In still other embodiments and/or applications where the solar absorber 20 has an outer diameter other than 70 mm, the outer diameter of the glass envelope 30 and the width of the space S may be other dimensions.

The solar absorber 20 and the glass envelope 30 have different coefficients of linear thermal expansion because they are constructed from different materials. The different linear thermal expansion coefficients cause the solar absorber 20 and the glass envelope 30 to expand and contract longitudinally (length-wise) at different rates. To compensate for the different linear thermal expansion and contractions, a collapsible or compressible edge welded metal (EWM) bellows assembly 90 is disposed at each end of the SHCE 10. The EWM bellows assembly 90 at each end of the SHCE 10 coaxially aligns the ends of the solar absorber 20 and the glass envelope 30. The EWM bellows assembly 90 allow the solar absorber 20 and glass envelope 30 to grow and shrink in length relative to one another when they are heated by the sun during the day and then cooled after the sun goes down at night.

Figure 2:
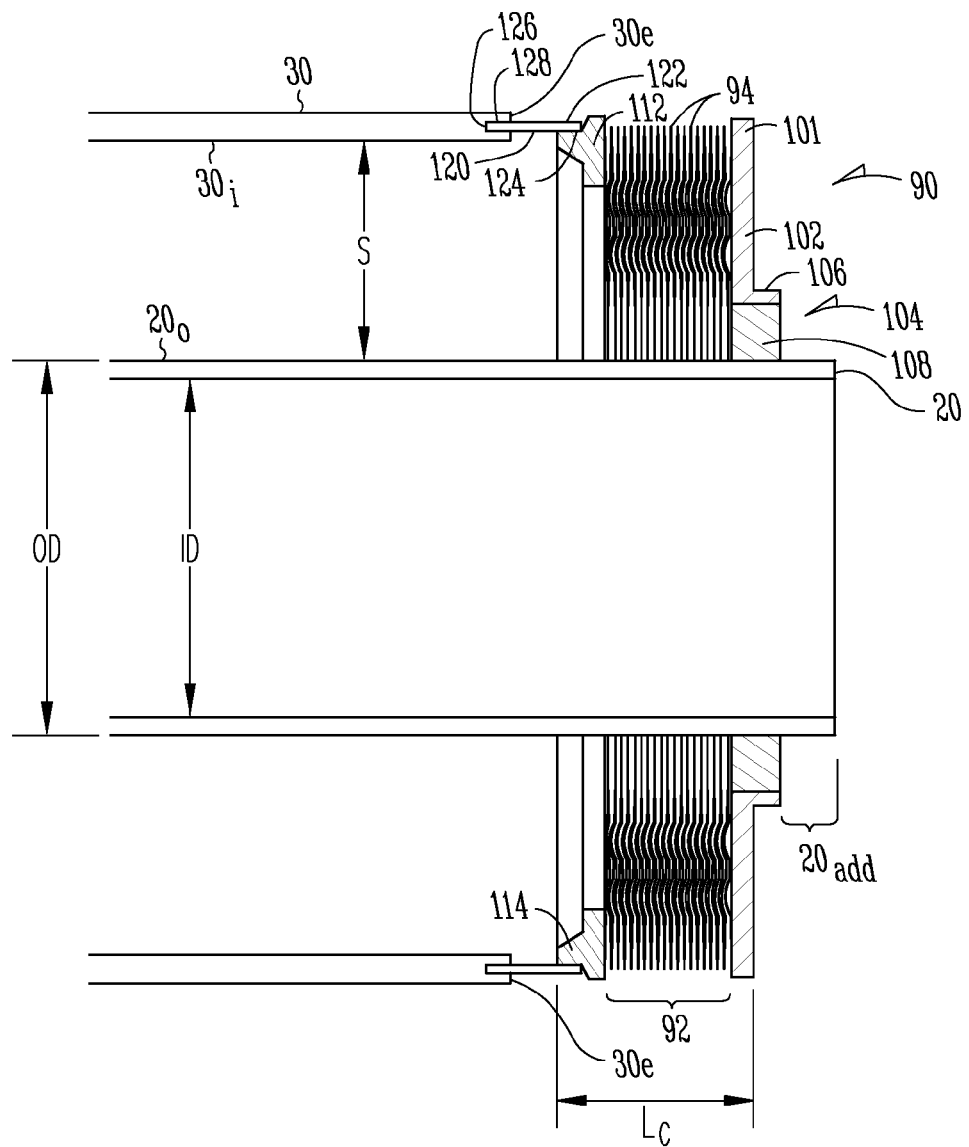
FIG. 2 is a cross-sectional view of one end of the solar heat collecting element of FIG. 1.

As shown in FIG. 2, the EWM bellows assembly 90 includes a flexible, hollow cylindrical intermediate structure 92 formed by a plurality of convolutions 94 disposed between first and second end members 101 and 110, respectively. The number of convolutions 94 depends upon the operating temperature of the SHCE 10 and the linear thermal expansion coefficients of the solar absorber 20 and the glass envelope 30. In one exemplary embodiment where the operating temperature will be between about 6 degrees centigrade and about 391 degrees centigrade, the solar absorber 20 is made of stainless steel, and the glass envelope has a highly light transmissive borosilicate glass composition, the EWM bellows assembly 90 includes between 6 and 8 convolutions.

The first end member 101 of the EWM bellows assembly 90 may be formed as a circular plate or closure structure 102 having a central opening 104 that allows the solar absorber 20 to pass through the end member 101. An outwardly extending circular flange or collar 106 surrounds the central opening 104. The first end member 101 may be made of stainless steel or any other suitable metallic material. The flange or collar 106 of the first end member 101 is permanently joined to the outer surface 20*o* of the solar absorber 20 by a hermetic seal 108. The hermetic seal 108 may be formed using any suitable hermetic sealing method including without limitation welding, brazing, soldering or adhesive bonding.

The second end member 110 comprises an annular or ring structure 112 having an exterior flange or lip 114 extending toward an edge 30*e* of the glass envelope 30. The second end member 110 may be made of stainless steel or any other suitable metallic material. A cylindrical extension member 120, made of a metal Kovar or any other suitable metallic material, is permanently joined at a first end 122 with the flange or lip 114 of the second end member 110 by a hermetic seal 124. Kovar is a metal alloy which is available from Special Metals Corporation, Huntington, W. Va., USA or KovarAlloy.com of New York, N.Y., USA under the name Kovar. Kovar Alloy is also know as ASTM F-15, NILO K, Pernifer 2918, Rodar, or Dilvar P1. In one embodiment, the metal used is a controlled expansion alloy that is a iron nickel cobalt alloy with approximately 29% Nickel, 17% cobalt, and 54% iron. More precisely, Ni:29%, Co:17%, <0.02%, Si:0.2%, Mn:0.3%, Fe:Balance (UNS K94610). The expansion characteristics of Kovar substantially match both borosilicate (or Pyrex) glasses and alumina ceramics which makes a good selection amongst the controlled expansion alloys for hermetic sealing applications. Put another way, the coefficient of thermal expansion of the nickel, cobalt and iron alloy substantially matches the the coefficient of thermal expansion of glass or pyrex which prevents damage or lessens the possibility of damage to the glass of the envelope or the metal of the end attached thereto. The hermetic seal 124 may be formed using any suitable hermetic sealing method including, without limitation, welding, brazing, soldering or adhesive bonding. A second end 126 of the extension member 120 is permanently joined with the edge 30*e* of the glass envelope 30 by a hermetic glass-to-metal seal 128. The hermetic glass-to-metal seal 128 may be formed using any suitable glass-to-metal seal forming method.

Figure 7:
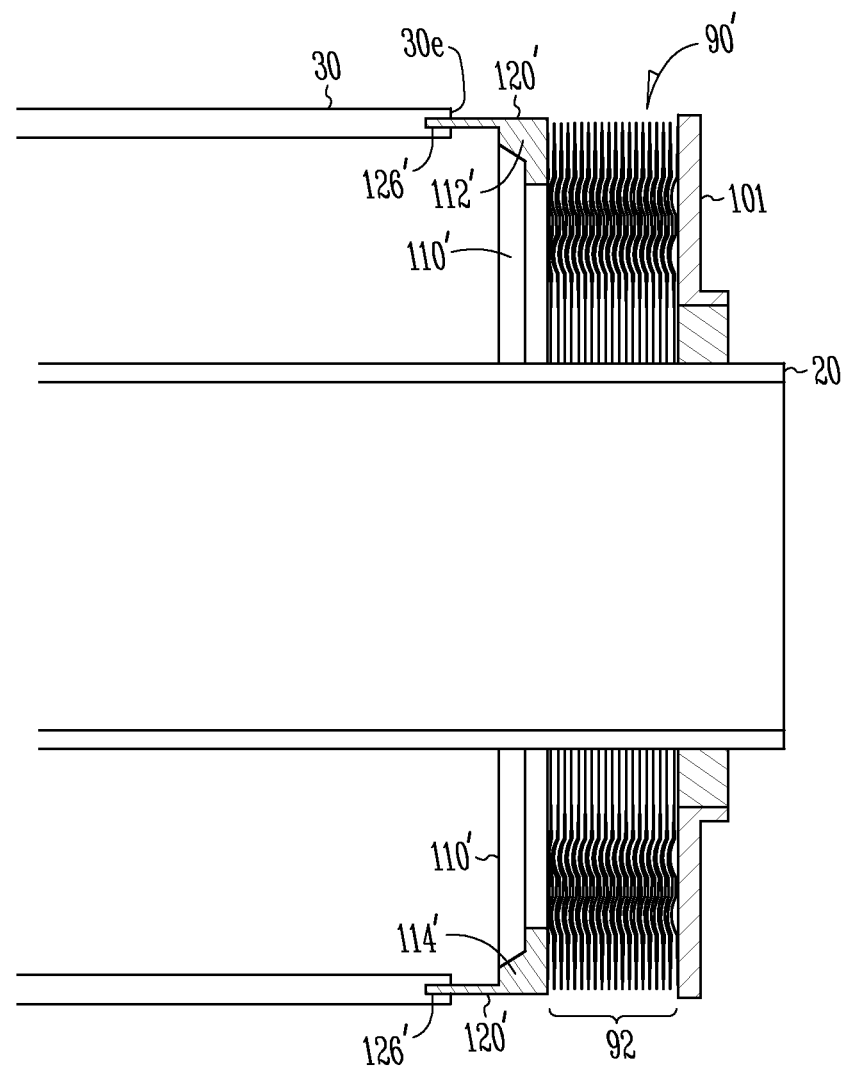
FIG. 7 is a cross-sectional view of one end of the solar heat collecting element illustrating another embodiment of the edge welded metal ("EWM") bellows assembly, according to the present disclosure.

FIG. 7 illustrates another embodiment of the EWM bellows assembly 90', where like elements are identified by like reference numerals. The EWM bellows assembly 90' is similar to the EWM bellows assembly 90 of FIG. 2, except that the second end member 110' and the cylindrical extension member 120' form a single unitary member made of Kovar. The nickel cobalt iron metal alloy has expansion characteristics which are substantially similar to glass, borosilicate (or Pyrex) glass and alumina ceramic. For example, the nickel cobalt iron alloy has substantially the same coefficient of thermal expansion as glass, borosilicate (or Pyrex) glass and alumina ceramic. As can be seen in FIG. 7, the cylindrical extension member 120' is unitary with the ring structure 112' of the second end member 110'. The free end 126' of the cylindrical extension member 120' is permanently joined with the edge 30*e* of the glass envelope 30 by a hermetic glass-to-metal seal 128.

Figure 3:
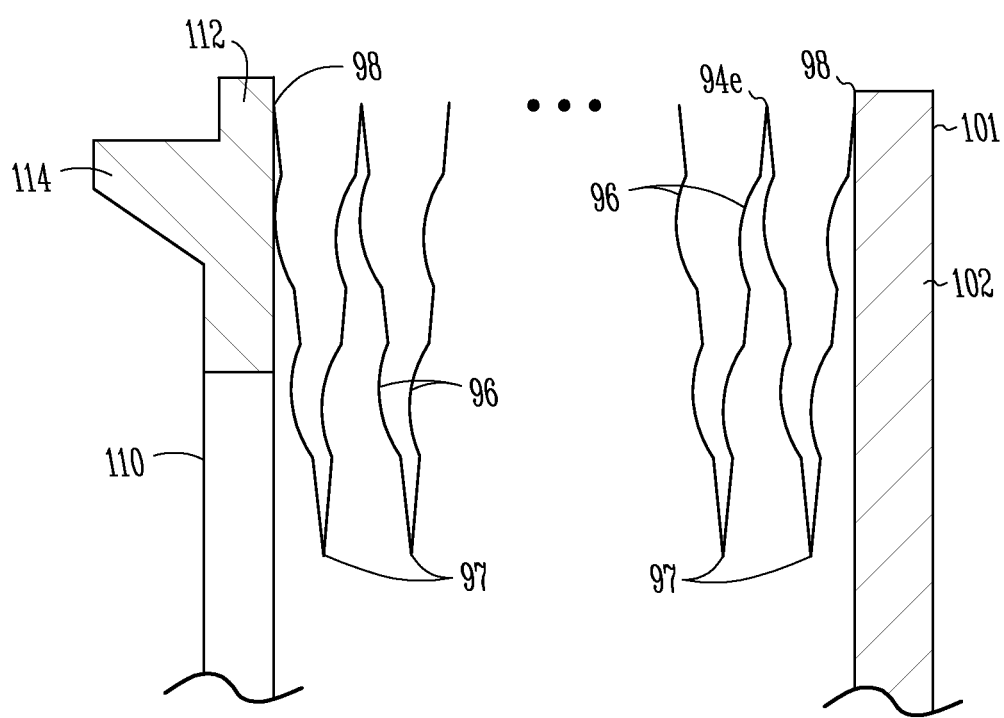
FIG. 3 is an enlarged cross-sectional view of an edge welded bellows assembly.

Referring to FIG. 3, each of the convolutions 94 of the intermediate (convolution) structure 92 of the EWM bellows assembly 90 is formed by a pair of contoured, ring-like plates 96 that are permanently attached at their inside diameters with a hermetic seal 97, which may be formed by welding, brazing, soldering or adhesive bonding. The pair of contoured, ring-like plates 96 form a single- or multiple-rippled nested configuration. More specifically, the bellows assembly 90 contains convolutions 92 shaped in such a manner so as to allow adjacent convolutions 92 to nest against one another with minimal to no clearance in between, when the bellows assembly 90 is in a compressed state.

As shown in FIG. 2, the convolution structure 92 has an inner diameter ID that is sized to allow the solar absorber 20 to radially expand under high operating temperatures without contacting the convolutions 94. For example, in one exemplary embodiment where the solar absorber 20 has an outer diameter OD of about 70 mm, the convolution structure 92 may have an inner diameter ID of about 85 mm. The ring-like plates 96 may be made of stainless steel or any other suitable metallic material. The convolution structure is formed by stacking a desired number of the convolutions 94 and permanently attaching them at their outside diameters with hermetic seals 98, which may be formed by welding, brazing, soldering or adhesive bonding. The convolution structure 92 may be fixedly connected to the end members 101 and 110 by respectively hermetic seals 101' and 111.

Figure 4:
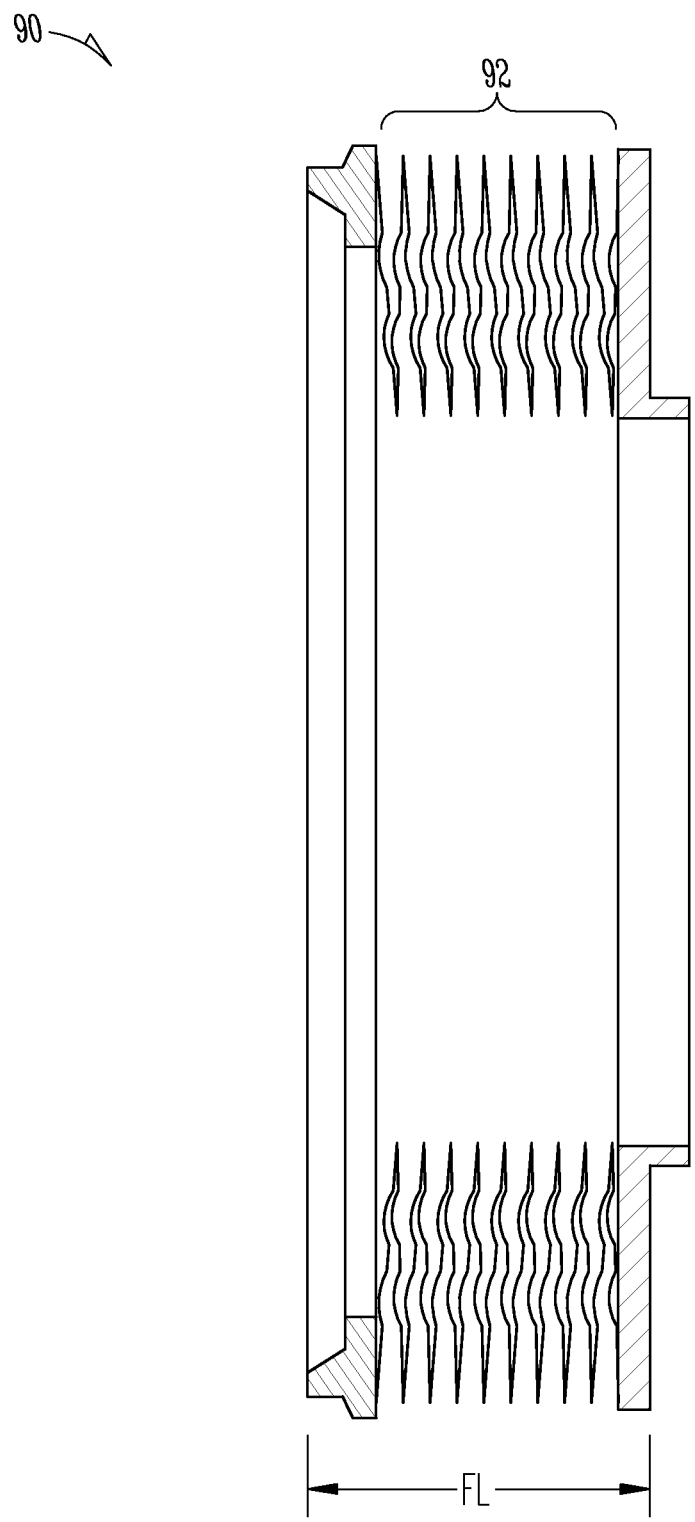
FIG. 4 is a cross-sectional view of the edge welded bellows assembly in an uncompressed and unexpanded state.

Referring to FIG. 4, the nested configuration of the convolution structure 92 provides the EWM bellows assembly 90 with an unexpanded, free-length FL that is substantially less than the unexpanded free-length of formed bellows used in prior art of SHCEs. For example, in one embodiment of a prior art SHCE, each of the formed bellows assemblies typically has an unexpanded free length of about 74 mm, at room temperature (about 68-72 degrees F.). In comparison, the EWM bellows assembly 90 of the present SHCE 10 has an unexpanded free-length FL of about 50 mm, at room temperature, which is about a 32 percent shorter than the unexpanded free-length of the prior art bellows assembly, at room temperature. Because the EWM bellows assembly 90 has a shorter unexpanded free-length, it covers less surface area of the solar absorber 20, which in turn, allows more surface area of the solar absorber 20 to be exposed to solar radiation.

Additionally, the convolutions 94 of the nested convolution structure 92 can be squeezed together until they slightly and temporarily deformed to allow the EWM bellows assembly 90 to be preloaded or compressed to about 80 percent of its unexpanded free-length $L_C$ or about 40 mm, at room temperature, as shown in FIG. 2. Such compression of the EWM bellows assembly 90 can be made without permanently deforming the convolutions 94. In contrast, prior art formed bellows cannot be compressed to a length that is significantly shorter than their unexpanded free-length. Accordingly, when the EWM bellows assembly 90 of the present SHCE 10 is preloaded or compressed to length $L_C$, it is about 46 percent shorter than the unexpanded free-length of the prior art bellows, at room temperature. The preloaded or compressed EWM bellows assembly 90 maintains its structural integrity and further increases the amount of surface area of the solar absorber 20 that is exposed to solar radiation, thereby leading to further increases in the optical efficiency of the solar absorber 20. The additional surface area of the solar absorber 20, which can be exposed to solar radiation by using the EWM bellows assembly 90, is identified in FIG. 2 by reference character $20_{add}$.

In a typical prior art SHCE having a solar absorber of 4.06 meters in length and a formed bellows at each end of the absorber, the available portion of the solar absorber's 4.06 meter length for exposure to solar radiation is about 3.912 meters. For comparison, the use of a preloaded or compressed EWM bellows assembly 90 ($L_C$ equal to about 40 mm) in the SHCE 10 of the present disclosure, allow about 3.98 meters of the solar absorber's 4.06 meter length to be exposed to solar radiation or approximately an additional 0.068 meters (68 mm). The increased exposure to light operates as a major factor in increasing the optical efficiency of the SHCE 10, resulting in more thermal energy (e.g., BTU/hour or watts,) available for conversion to electricity or other renewable energy applications.

In one embodiment, the SHCE 10 is manufactured by permanently joining the flange or lip 114 of the second end member 110 of the EWM bellows assembly 90 with the first end 122 of the metallic cylindrical extension member 120 via the hermetic seal 124. The second end 126 of the extension member 120 is permanently joined with the edge 30e of the glass envelope 30 via the hermetic glass-to-metal seal 128. The EWM bellows assembly 90 is preloaded or compressed to a desired compressed length $L_C$ and then the flange or collar 106 of first end member 100 of the EWM bellows assembly 90 is permanently joined with the outer surface 20o of the solar absorber 20 using the hermetic seal 108.

Figure 8:
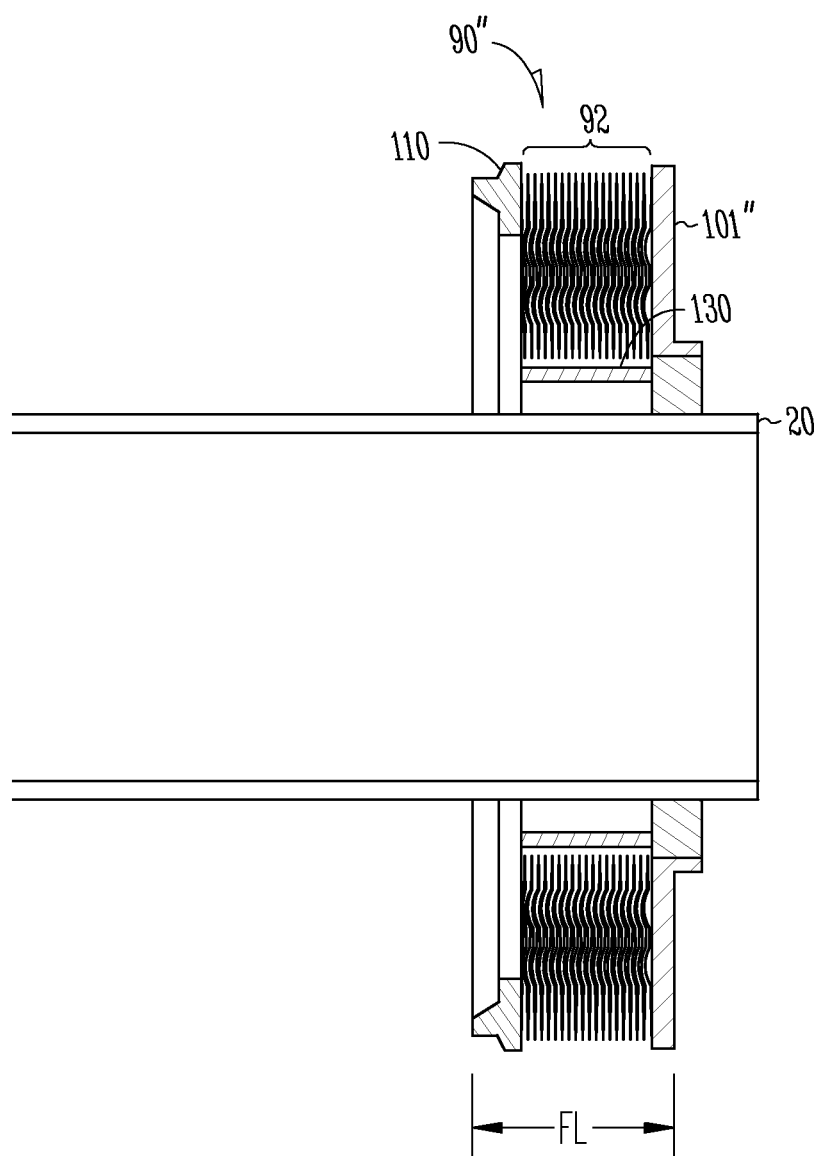
FIG. 8 is a cross-sectional view of one end of the solar heat collecting element illustrating a further embodiment the edge welded metal ("EWM") bellows assembly, according to the present disclosure.

FIG. 8 shows another embodiment the EWM bellows assembly 90" where like elements are identified by like reference numerals. The EWM bellows assembly 90" is similar to the EWM bellows assemblies described earlier, except that it comprises a cylindrical radiation shield 130 that extends from the inner surface of the first end member 101" to shield the convolution structure 92 from the absorber 20. The radiation shield 130 has an outer diameter that is somewhat less than the inner diameter ID of the convolution structure 92, thereby providing a space between the convolution structure 92 and the radiation shield 130. In one embodiment, a vacuum gap is used where the components are not in direct contact. The heat transfer would be dominated by radiation between the two surfaces. The radiation shield 130 has an inner diameter that is somewhat greater than the central opening 104" of the first end member 101", thereby providing a space or vacuum gap between the radiation shield 130 and the absorber 20. The radiation shield 130 can be attached to the inner surface of the first end member 100" by a hermetic seal or made unitary with the first end member 100".

Although the SHCE, solar trough, and solar power system have been described in terms of exemplary embodiments, they are not limited thereto. Rather, the appended claims should be construed broadly, to include other variants and embodiments of same, which may be made by those skilled in the art without departing from the scope and range of equivalents of same.

What is claimed is:

1. A solar heat collecting element comprising:
   a conduit for carrying a heat transfer fluid, the conduit having first and second ends;
   a light transparent envelope disposed about the conduit, the light transparent envelope having first and second ends and a longitudinal axis;
   an edge welded metal bellows assembly comprising:
     a first annular end member comprising:
       a convolution attachment member having a convolution attachment surface;
       an extension member that extends perpendicularly to the convolution attachment surface, the extension member being configured to engage the light transparent envelope; and
       a plurality of annular convolutions coupled to the convolution attachment surface and extending in a direction away from the light transparent envelope along the longitudinal axis of the light transparent envelope, wherein the convolution attachment member and the extension member are unitary and formed from a same material, wherein each of the plurality of annular convolutions has a same maximum diameter, the maximum diameters of the plurality of annular convolutions defining a substantially cylindrical volume; and an end member subassembly comprising:
a second annular end member, wherein the plurality of annular convolutions is fixed with respect to the first annular end member and the second annular end member; and
a seal coupled to the second annular end member and to the conduit; and a substantially cylindrical annular radiation shield directly coupled to the end member subassembly substantially parallel to the substantially cylindrical volume defined by the maximum diameters of the plurality of annular convolutions, the radiation shield extending between at least a portion of the plurality of annular convolutions and the conduit, the radiation shield being detached from the plurality of annular convolutions and spaced from the plurality of annular convolutions.

2. The solar heat collecting element of claim 1, wherein the edge welded metal bellows assembly is in a compressed state at room temperature.

3. The solar heat collecting element of claim 1, wherein the conduit is made of stainless steel or carbon steel.

4. The solar heat collecting element of claim 1, wherein the light transparent envelope is made of glass.

5. The solar heat collecting element of claim 1, wherein the edge welded metal bellows assembly is made of stainless steel.

6. The solar heat collecting element of claim 1, wherein the edge welded metal bellows assembly is made of stainless steel and a metal having substantially a same expansion characteristic as an expansion characteristic of the light transparent envelope.

7. The solar heat collecting element of claim 1, wherein the end member is made of a metal having substantially a same expansion characteristic as an expansion characteristic of the light transparent envelope.

8. The solar heat collecting element of claim 1, wherein the edge welded metal bellows assembly includes the second annular end member fixedly attached to the conduit.

9. The solar heat collecting element of claim 1, further comprising another edge welded metal bellows assembly coupling the second end of the conduit with the second end of the light transparent envelope.

10. The solar heat collecting element of claim 1, wherein the edge welded metal bellows assembly comprises the second annular end member fixedly attached to the conduit and the plurality of annular convolutions is disposed between the first annular end member and the second annular end member.

11. The solar heat collecting element of claim 1, wherein the extension member extends from the convolution attachment member perpendicularly to the convolution attachment surface in a direction toward the light transparent envelope, and wherein the plurality of annular convolutions extend from the convolution attachment member in the direction away from the light transparent envelope along the longitudinal axis of the light transparent envelope.

12. A solar trough comprising:
a solar heat collecting element comprising:
a conduit for carrying a heat transfer fluid, the conduit having first and second ends;
a light transparent envelope disposed about the conduit, the light transparent envelope having first and second ends and a longitudinal axis; and
an edge welded metal bellows assembly comprising:
a first annular end member comprising:
a convolution attachment member having a convolution attachment surface;
an extension member that extends perpendicularly to the convolution attachment surface, the extension member being configured to engage the light transparent envelope; and
a plurality of annular convolutions coupled to the convolution attachment surface and extending in a direction away from the light transparent envelope along the longitudinal axis of the light transparent envelope, wherein the convolution attachment member and the extension member are unitary and formed from a same material, wherein each of the plurality of annular convolutions has a same maximum diameter, the maximum diameters of the plurality of annular convolutions defining a substantially cylindrical volume; and
an end member subassembly comprising:
a second annular end member, wherein the plurality of annular convolutions is fixed with respect to the first annular end member and the second annular end member; and
a seal coupled to the second annular end member and to the conduit; and
a substantially cylindrical annular radiation shield directly coupled to the end member subassembly substantially parallel to the substantially cylindrical volume defined by the maximum diameters of the plurality of annular convolutions, the radiation shield extending between at least a portion of the plurality of annular convolutions and the conduit, the radiation shield being detached from the plurality of annular convolutions and spaced from the plurality of annular convolutions; and
a light concentrator for directing solar radiation onto the solar heat collecting element.

13. The solar trough of claim 12 wherein the light concentrator comprises a parabolic mirror.

14. The solar trough of claim 12, wherein the edge welded metal bellows assembly is in a compressed state at room temperature.

15. The solar trough of claim 12, wherein the conduit is made of stainless steel.

16. The solar trough of claim 12, wherein the conduit is made of carbon steel.

17. The solar trough of claim 12, wherein the light transparent envelope is made of glass.

18. The solar trough of claim 12, wherein at least a portion of the edge welded metal bellows assembly is made of a material having substantially a same expansion characteristic as an expansion characteristic of the light transparent envelope.

19. The solar trough of claim 12, wherein the extension member extends from the convolution attachment member perpendicularly to the convolution attachment surface in a direction toward the light transparent envelope, and wherein the plurality of annular convolutions extend from the convolution attachment member in the direction away from the light transparent envelope along the longitudinal axis of the light transparent envelope.

* * * * *